(12) United States Patent
Shveidel et al.

(10) Patent No.: US 11,200,122 B2
(45) Date of Patent: Dec. 14, 2021

(54) BARRIERLESS SNAPSHOTS

(71) Applicant: EMC IP HOLDING COMPANY LLC, Hopkinton, MA (US)

(72) Inventors: Vladimir Shveidel, Pardes-Hana (IL); David Bar, Rishon Lezion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 244 days.

(21) Appl. No.: 16/520,507

(22) Filed: Jul. 24, 2019

(65) Prior Publication Data

US 2021/0026744 A1 Jan. 28, 2021

(51) Int. Cl.
*G06F 11/14* (2006.01)

(52) U.S. Cl.
CPC ...... *G06F 11/1474* (2013.01); *G06F 11/1451* (2013.01); *G06F 2201/84* (2013.01)

(58) Field of Classification Search
CPC ............. G06F 11/1451; G06F 11/1474; G06F 2201/84
See application file for complete search history.

(56) References Cited

U.S. PATENT DOCUMENTS

| | | | | |
|---|---|---|---|---|
| 6,978,400 B2* | 12/2005 | Hickson | .................. | G06F 16/10 714/37 |
| 7,165,145 B2* | 1/2007 | Lam | ..................... | G06F 11/2064 707/999.202 |
| 8,161,211 B2* | 4/2012 | Hirayama | ............... | H03M 7/30 710/68 |
| 8,452,929 B2* | 5/2013 | Bennett | ............... | G06F 12/0246 711/162 |
| 2013/0339569 A1* | 12/2013 | Yochai | ................ | G06F 11/1415 711/102 |
| 2018/0262566 A1* | 9/2018 | Liu | ...................... | G06F 12/0246 |

* cited by examiner

*Primary Examiner* — Joseph R Kudirka
(74) *Attorney, Agent, or Firm* — Daly, Crowley, Mofford & Durkee, LLP (57) ABSTRACT

A method is provided comprising: generating a snapshot of a volume in a storage system; generating a snapshot marker and adding the snapshot marker to a transaction log of the storage system; scanning the transaction log to identify one or more records that have been added to the transaction log before the snapshot marker, and marking each of the identified records as a splitflush record; flushing any record that is stored in the transaction log by: (a) detecting whether the record is marked as a splitflush record, (b) when the record is marked as a splitflush record, copying the record both to a data store and to the snapshot, and (c) when the record is not marked as a splitflush record, copying the record to the data store only.

20 Claims, 8 Drawing Sheets

BARRIERLESS SNAPSHOTS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: generating a snapshot of a volume in a storage system; generating a snapshot marker and adding the snapshot marker to a transaction log of the storage system; scanning the transaction log to identify one or more records that have been added to the transaction log before the snapshot marker, and marking each of the identified records as a splitflush record; flushing any record that is stored in the transaction log by: (a) detecting whether the record is marked as a splitflush record, (b) when the record is marked as a splitflush record, copying the record both to a data store and to the snapshot, and (c) when the record is not marked as a splitflush record, copying the record to the data store only.

According to aspects of the disclosure, a system is provided comprising: a memory; one or more processors operatively coupled to the memory, the one or more processors being configured to perform the operations of: generating a snapshot of a volume in a storage system; generating a snapshot marker and adding the snapshot marker to a transaction log of the storage system; scanning the transaction log to identify one or more records that have been added to the transaction log before the snapshot marker, and marking each of the identified records as a splitflush record; flushing any record that is stored in the transaction log by: (a) detecting whether the record is marked as a splitflush record, (b) when the record is marked as a splitflush record, copying the record both to a data store and to the snapshot, and (c) when the record is not marked as a splitflush record, copying the record to the data store only.

According to aspects of the disclosure, a non-transitory computer-readable medium is provided storing processor-executable instructions, which when executed by at least one processor cause the processor to perform the operations of: generating a snapshot of a volume in a storage system; generating a snapshot marker and adding the snapshot marker to a transaction log of the storage system; scanning the transaction log to identify one or more records that have been added to the transaction log before the snapshot marker, and marking each of the identified records as a splitflush record; flushing any record that is stored in the transaction log by: (a) detecting whether the record is marked as a splitflush record, (b) when the record is marked as a splitflush record, copying the record both to a data store and to the snapshot, and (c) when the record is not marked as a splitflush record, copying the record to the data store only.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
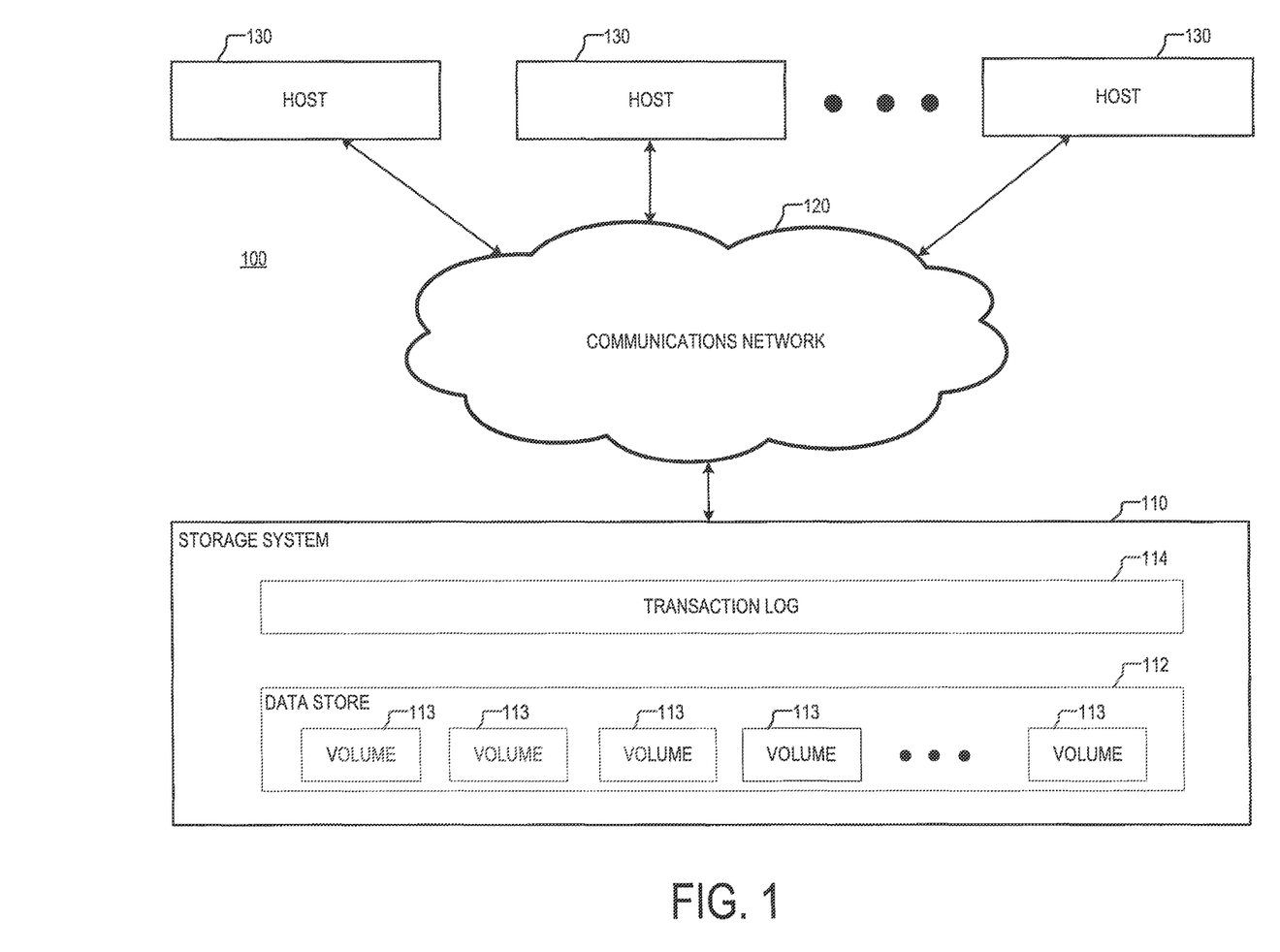
FIG. 1 is a diagram of an example of a system, according to aspects of the disclosure.

FIG. 1 is a diagram of an example of a system 100, according to aspects of the disclosure. The system 100 may include a storage system 110 that is coupled to one or more host devices 130 via a communications network 120. The communications network 120 may include a local area network (LAN), a wide area network (WAN), the Internet, and/or any or suitable type of communications network. Each of the host devices 130 may include a desktop computer, a laptop computer, a smartphone, a digital media player, and/or any other suitable type of electronic device. The storage system 110 may include a midrange storage system, an enterprise storage system, and/or any other suitable type of storage system. As illustrated, the storage system 110 may include a data store 112 and a transaction log 114. The data store 112 may include one or more storage devices that are configured to implement a plurality of data volumes 113. According to the present example, the data store 112 includes a RAID array. However, it will be understood that the present disclosure is not limited to any specific implementation of the data store 112.

The transaction log 114 may include a memory buffer where data is stored before being copied to one of the data volumes 113. In operation, the storage system 110 may receive a write request from any of the host devices 130, store data contained in the write request in the transaction log 114, and transmit, to the host device, an acknowledgment corresponding to the write request. After the acknowledgment is completed, the storage system 110 may copy the data from the transaction log 114 into any of the data volumes 113. In some respects, saving data into any of the data volumes 113 may take longer than storing data into the transaction log 114 because it may require additional operations such as calculating error codes or generating mapping metadata. In this regard, storing data (that is associated received write requests) in the transaction log 114 first, and then copying the data to the data store 112 (e.g., to one or more of the data volumes 113) enables the system to acknowledge received write requests at a faster rate, thus reducing the storage system's 110 overall response time.

Figure 2A:
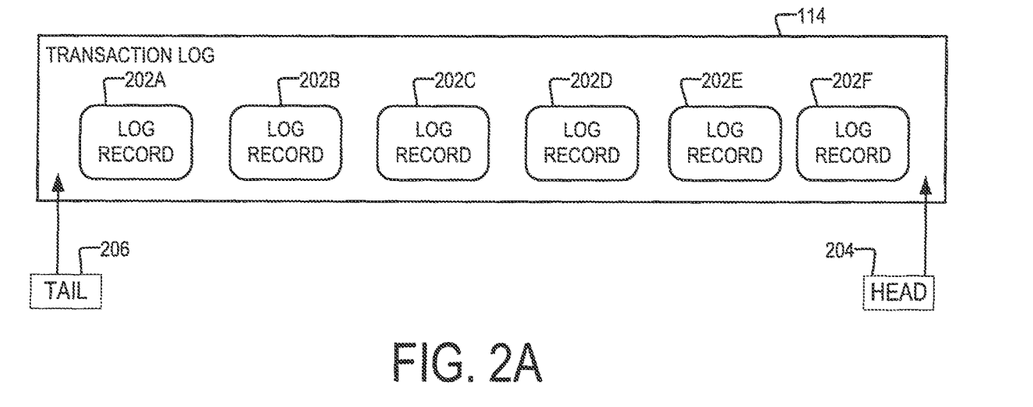
FIG. 2A is a diagram of an example of a transaction log, according to aspects of the disclosure.

FIG. 2A shows an example of the transaction log 114 in further detail. In the example of FIG. 2, the transaction log 114 is implemented as a ring buffer including a plurality of records 202, a head pointer 204, and a tail pointer 206. The head pointer 204 may identify a location at the ring buffer that is available to receive a record 202. When user data is added to the transaction log 114, a new record 202 is generated that contains the user data. The newly-generated record is subsequently added at the head of the ring buffer. Specifically, the newly-generated record 202 may be stored at the location identified by the head pointer 204, after which the value of the head pointer 204 may be changed to point to a "next" location.

The tail pointer 206 may identify the oldest record 202 in the transaction log 114, which has not been flushed yet. Records 202 may be removed from the transaction log 114 in parallel from the tail of the transaction log 114. Specifically, when a record 202 (identified by the tail pointer 206) is removed from the transaction log 114, user data 210 (shown in FIG. 2B) contained in the record 202 may be copied from the transaction log 114 to the data store 112, after which the record 202 may be marked as "flushed". After the record 202 is marked as "flushed," the value of the tail pointer 206 may be changed to point to another record 202 in the transaction log 114—namely, the oldest record 202 in the transaction log which has not been marked as "flushed" yet. In some implementations, after a record 202 is marked as "flushed," this record may be eventually reclaimed by a garbage collector. As used throughout the disclosure, the term "flush" shall refer to the copying (or destaging) of user data 210, contained in any of the records 202, from the transaction log 114 into the data store 112 (and/or one or more of the volumes 113).

Figure 2B:
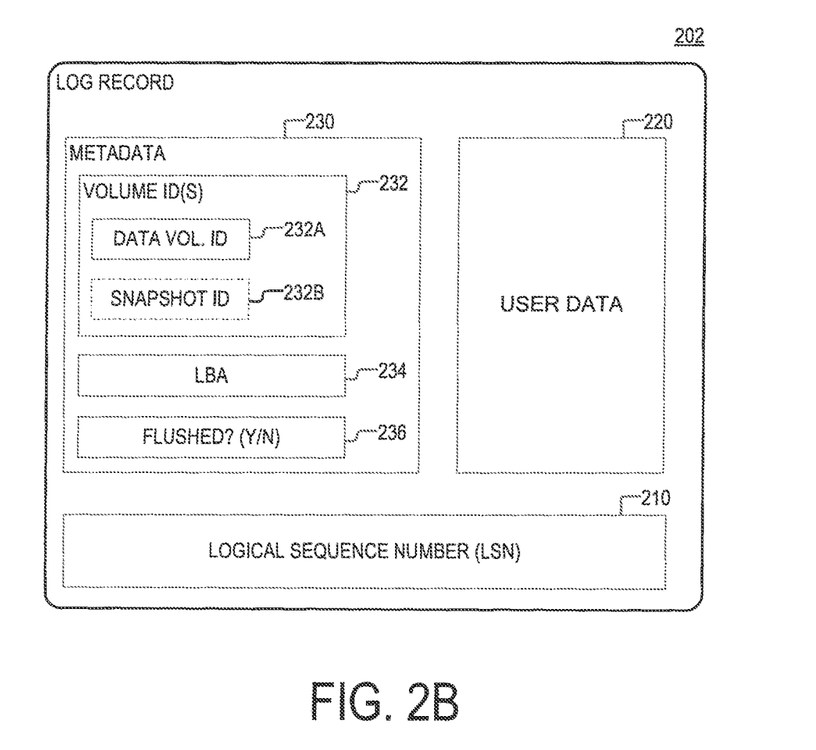
FIG. 2B is a diagram of an example of a transaction log record, according to aspects of the disclosure.

FIG. 2B shows an example of a record 202, according to aspects of the disclosure. As illustrated, the record 202 may include a logical sequence number (LSN) 210, user data 220, and metadata 230.

The LSN 210 may include any suitable type of number, string, or alphanumerical string that indicates the order in which the record 202 is added to the transaction log 114. The LSN 210 may include a timestamp, a serial number, and/or any other incremental (or decremental) index that represents the location of the record 202 in the transaction log 114. For example, in some implementations, records 202 that are added to the transaction log 114 earlier may have smaller LSNs 210 that records 202 that are added later. As is further discussed below, the LSNs of the records 202 in the transaction log 114 may be used to determine the order in which the records 202 are added to the transaction log 114.

The user data 220 may include any suitable type of data that is requested to be stored in one of the data volumes 113. For example, the user data 220 may include a page of data that is received with a write request at the storage system 110. The user data 220 may include documents, media, and/or any other data one might desire to store in the storage system 110. In some implementations, the user data 220 may include a page of data that is received with a write request from one of the host devices 130.

The metadata 230 may include any suitable type of metadata that is needed for storing the user data 220 in one of the data volumes 113. In some implementations, the metadata may include one or more volume ID(s) 232, a logical block address (LBA) 234, and a marker 236. In some implementations, the metadata 230 may be extended to support more-than-one volume ownership of the records 202. As is further discussed below, the support of more-than-one volume owner allows generated volume snapshots to be updated with the contents of records 202 after the snapshots are generated. The capability to update already-generated snapshots allows the snapshots to be maintained in a consistent state, without the use of mechanisms such as barrier objects or sequential writing, which are known to degrade system performance. According to the present disclosure, a destination volume that is designated to receive the user data 220 may be referred to as an "owner" of the data.

The volume ID(s) 232 may include a first volume ID 232a and a second volume ID 232b. The first volume ID 232a may identify a destination volume (e.g., owner volume) where the user data 220 is desired to be copied (e.g., one of the data volumes 113). The second volume ID 232b may identify a snapshot of the destination volume, where the user data 220 is required to be copied. The second volume ID 232b may be set only when there is a snapshot of the destination volume needs to be updated to include (or otherwise identify) the user data 220. When no snapshot of the destination volume needs to be updated based on the contents of the record 202, the second volume ID 232b may be equal to NULL. In some implementations, when the second volume ID 232b of a record 202 is set to identify a particular snapshot, that record is considered to be marked as a "splitflush" record.

The LBA 234 may identify an address in the destination volume (identified by the first volume ID 232a) where the user data 220 is required to be copied. The marker 236 may indicate whether the record 202 has been flushed already. If the marker 236 has a first value, this may be an indication that the log record 202 has been flushed. Otherwise, if the marker 236 has a second value, this may be an indication that the log record 202 has not been flushed. In instances in which the second volume ID 232b is set, the marker may be set to the first value only after the user data 220 has been copied to both the destination volume (identified by the first volume ID 232a) and the snapshot (identified by the second volume ID 232b). As noted above, after the marker is set to the first value, the record 202 may be reclaimed by a garbage collector of the storage system 110. In some respects, arranging the metadata 230 to include the second volume ID 232b extends the capabilities of the storage system 110 to identify and manage data needed for the updating of snapshots by using existing mechanisms for storing and reclaiming the data, without the creation of radically new flows.

Figure 2C:
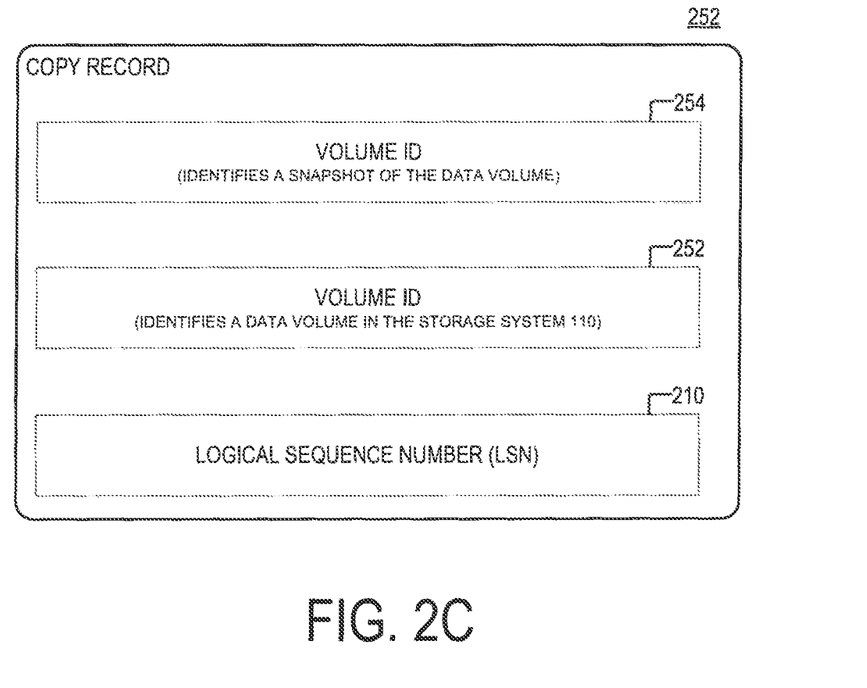
FIG. 2C is a diagram of an example of a copy record, according to aspects of the disclosure.

FIG. 2C shows an example of a copy record 250, according to aspects of the disclosure. The copy record 250 may include a record that is added to the transaction log 114 when a snapshot of a data volume in the storage system 110 is generated. The copy record 250 may include an LSN 210, a volume ID 252 that identifies a given data volume 113 in the storage system 110, and a snapshot ID 254 that identifies a snapshot of the given data volume 113. When the copy record 250 is added to the transaction log 114, the LSN 210 of the copy record 250 (in combination of the LSNs of the records 202 in the transaction log 115) may be used to identify records 202 that have been added to the transaction log 114 before the copy record 250, and records 202 that have been added to the transaction log 114 after the copy record 250. As discussed further below, being able to identify records 202 which have been added to the transaction log 114 before the copy record 250 can be used in marking these records as spliflush records.

Figure 3:
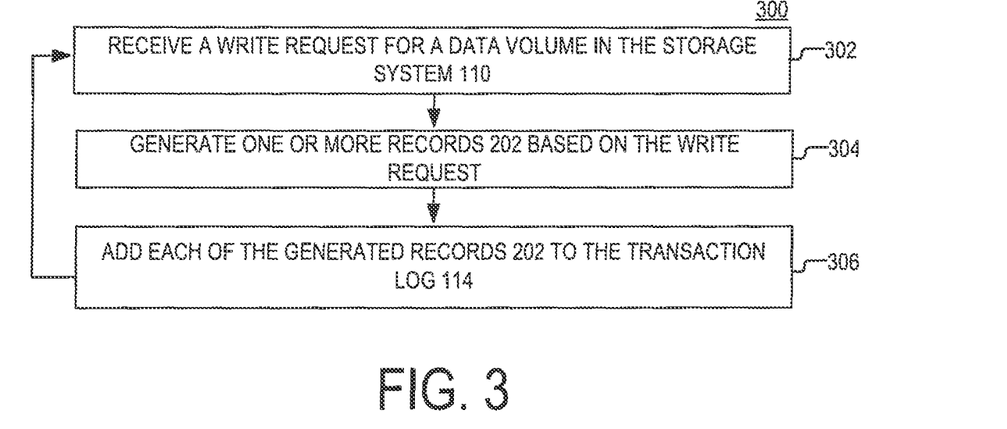
FIG. 3 is a flowchart of an example of a process, according to aspects of the disclosure.

FIG. 3 shows an example of a process 300 for adding records 202 to the transaction log 114, according to aspects of the disclosure. At step 302, a write request is received at the storage system 110. The received write request may include user data, a volume identifier identifying a given data volume 113 in the storage system 110 where the user data is requested to be written, and an address identifier identifying the address in the given data volume 113 where the user data is requested to be written. At step 304, one or more records 202 are generated based on the write request. Each of the records 202 may include user data 220 (which includes at least a portion of the user data received with the write request), a first volume ID 232a identifying the given data volume 113, and an LBA 234 identifying a location in the given data volume 113 where the user data 220 is required to be written. At step 306, each of the generated records 202 is added to the transaction log 114.

Figure 4:
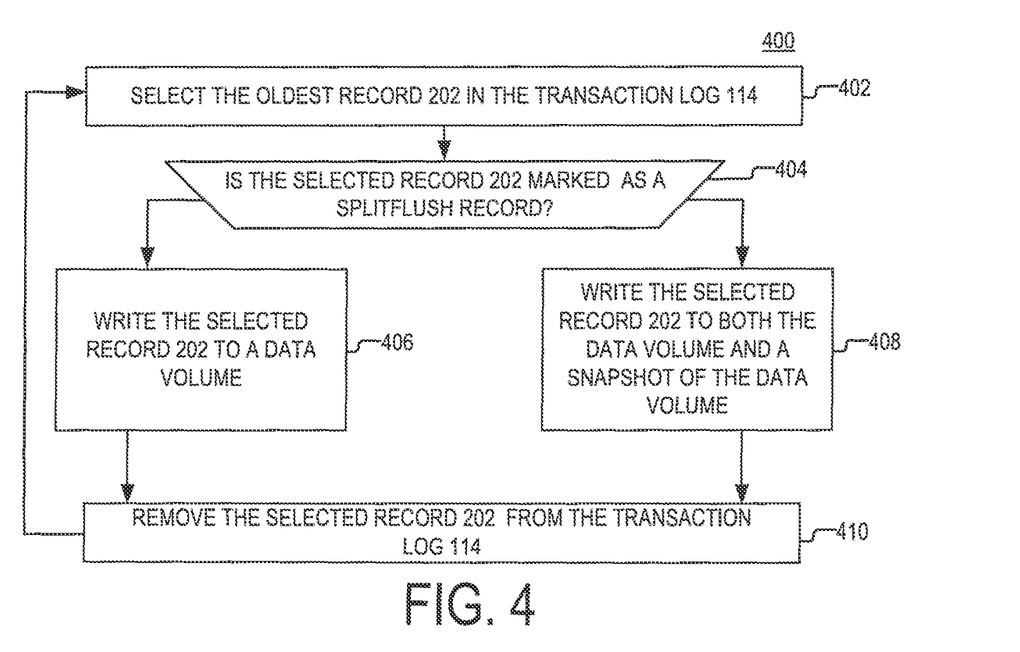
FIG. 4 is a flowchart of an example of a process, according to aspects of the disclosure.

FIG. 4 shows an example of a process 400 for removing records 202 from the transaction log 114, according to aspects of the disclosure. At step 402, a record 202 in the transaction log 114 is selected for removal from the transaction log 114. At step 404, a determination is made if the selected record 202 is marked as a splitflush record. As noted above, the selected record 202 may be marked as a splitflush record if the second volume ID 232b of the selected record 202 is set to identify a particular snapshot (as opposed to being NULL). If the selected record 202 is not marked as a splitflush record, the process 400 proceeds to step 406. Otherwise, if the selected record 202 is marked as a splitflush record, the process 400 proceeds to step 408. At step 406, the selected record 202 is written only to the data volume identified by the first volume ID 232a (of the selected record 202). At step 408, the selected record 202 is written to both the data volume 113 that is identified by the first volume ID 232a (of the selected record 202) and the snapshot identified by the second volume ID 232b (of the selected record 202). At step 410, the selected record 202 is removed from the transaction log 114.

In some implementations, writing a given record 202 to a data volume may include: identifying the data volume 113 that is referenced by the record's 202 first volume ID 232a, identifying a location in the data volume 113 that is referenced by the record's LBA 234, and writing the record's user data 220 at the identified location. In some implementations, writing a given record 202 to a snapshot may include generating metadata based on at least one of the record's first volume ID 232a, LBA 234, and user data 220 and adding the generated metadata to the snapshot. Additionally or alternatively, in some implementations, writing a given record 202 to a snapshot may include adding the user data 220 (or a digest of the user data 220) to the snapshot. In some implementations, removing a record from a transaction log may include marking the record as flushed. Additionally or alternatively, in some implementations, removing a record from a transaction log may include deleting the record. Additionally or alternatively, in some implementations, selecting a given record 202 for removal from the transaction log 114 may include selecting the oldest record 202 in the transaction log 114 (e.g., the record with the smallest or largest LSN 210).

Although the example of FIG. 4 is presented in the context of removing only one record, it will be understood that alternative implementations are possible in which multiple records 202 are removed in parallel (from the transaction log 114) in accordance with the process 400. Furthermore, it will be understood that in some implementations, the process 400 may be executed in parallel with the process 300, which is discussed above with respect to FIG. 3.

Figure 5A:
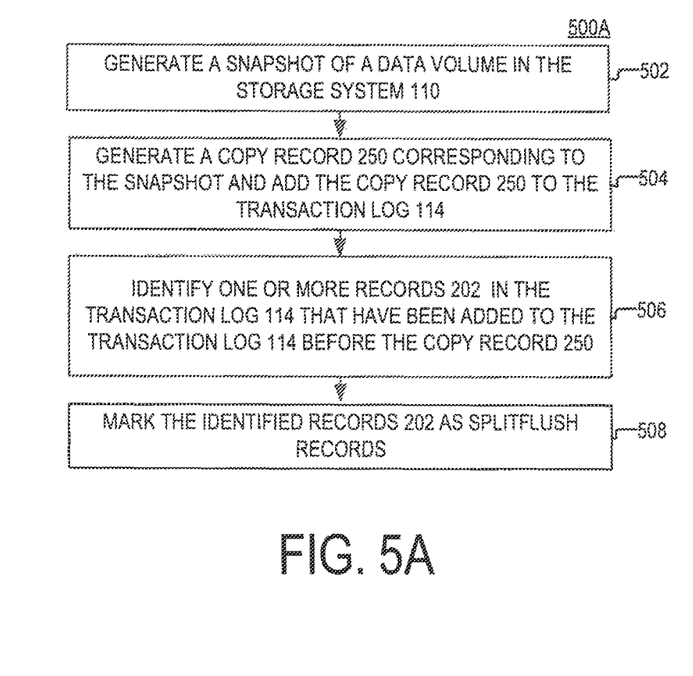
FIG. 5A is a flowchart of an example of a process, according to aspects of the disclosure.
Figure 5B:
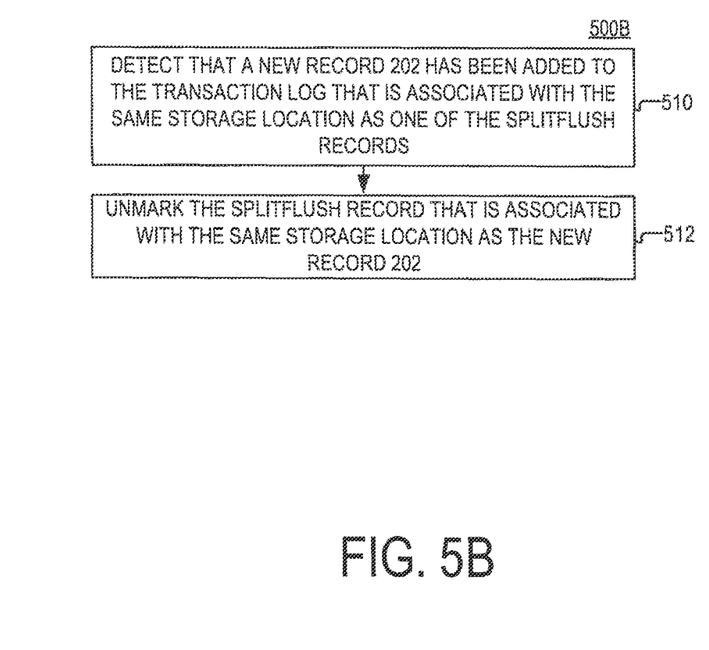
FIG. 5B is a flowchart of an example of a process, according to aspects of the disclosure.

FIGS. 5A and 5B show an example of processes 500A and 500B for finalizing a snapshot of a data volume, according to aspects of the disclosure. In some implementations, processes 500A and 500B may be performed concurrently with one another. Additionally or alternatively, in some implementations, processes 500A and 500B may be performed and concurrently with processes 300 and 400, which are discussed above with respect to FIGS. 3 and 4, respectively.

Turning to the process 500A, at step 502, a snapshot of a given data volume 113 is generated. At step 504, a copy record 250 is generated for the snapshot and added to the transaction log 114. The copy record 250 may include an LSN 210 (which identifies the time when the copy record 250 is generated and/or added to the transaction log), a volume ID 252 that identifies the given data volume 113, and a snapshot ID 254 that identifies the snapshot. In some implementations, the copy record may have (or be compliant with) the same interface as the records 202, and it may be usable with the same APIs that are used to process the records 202.

At step 506, a scan is performed of the transaction log 114 to identify one or more records 202 that have been added to the transaction log 114 before the copy record 250. In some implementations, the one or more records 202 may be identified based on their respective LSN's 210. Additionally or alternatively, in some implementations, the identified records 202 may include only records 202 whose respective LSNs 210 are smaller than the LSN 210 of the copy record 250. Alternatively, in some implementations, the identified records 202 may include only records 202 whose respective LSNs 210 are larger than the LSN 210 of the copy record 250. Additionally or alternatively, in some implementations, the identified records 202 may include only records 202 which haven't been flushed yet (i.e., records that are not marked as "flushed" by their respective markers 236). Additionally or alternatively, in implementations in which the transaction log 114 contains records for multiple data volumes 113, each of the identified records 202 may be associated with the given data volume 113 whose snapshot is created at step 502, and as such, it can include a first volume ID 232a that matches the volume ID 252 of the copy record 250.

At step 508, each of the identified records 202 is marked as a splitflush record. In some implementations, marking any of the identified records 202 as a splitflush record may include inserting in that record 202 a second volume ID 232b that corresponds to the snapshot generated at step 502. Additionally or alternatively, in some implementations, marking any of the identified records 202 as a splitflush record may include retrieving, from the copy record 250, the snapshot ID 254, and inserting the retrieved snapshot ID 254 into the identified record 202 (e.g., by setting the value of the second volume ID 232b to equal the value of the snapshot ID 254). As discussed above with respect to FIG. 4, marking a record 202 as a splitflush record causes the record to be written to both the given data volume 113 and the snapshot of the given data volume 113, which is generated at step 502.

Turning to the process 500B, at step 510, a new record 202 is detected, which has been added to the transaction log 114 after the copy record 250, and which is associated with the same storage location as a respective one of the records 202 that are marked as splitflush records (at step 508). In some implementations, a new record 202 may be associated with the same storage location as a respective (splitflush) record 202 when: (1) the first volume ID 232a of the new record 202 has the same value as the first volume ID 232a of the respective (splitflush) record, and (2) the LBA 234 of the new record 202 has the same value as the LBA 234 of the respective (splitflush) record.

At step 512, the respective (splitfulush) record 202 is unmarked. Unmarking the respective (splitflush) record 202 may include deleting from it the second volume ID 232b, which identifies the snapshot generated at step 502. In some instances, the respective (splitflush) record 202 may be unmarked while it is already being written to the snapshot generated at step 502. In such instances, unmarking the respective (splitflush) record 202 may have no effect on the performance of the storage system 110. However, in other instances, the respective (splitflush) record 202 may be unmarked before it is written to the snapshot. In such instances, unmarking the respective (splitflush) record 202 may prevent the storage system 110 from wasting resources on recording into the snapshot data that is already obsolete.

In some implementations, a snapshot generated may be in a consistent state when it can be used to restore all data (received with write requests) that has been acknowledged by a storage system prior to the creation of the snapshot. Storage systems in the prior art often use barrier objects to control the order in which records are flushed from a transaction log, so as to ensure that no acknowledged records remain unflushed prior to the creation of the snapshot. Using such barrier objects effectively causes all records that have been acknowledged prior to the creation of the snapshot to be flushed before the snapshot is created. However, in systems that use intensive snapshotting and a large number of barriers, this process may become unpredictable as it can introduce cross-data dependencies and block I/O processing as a result.

The approach discussed with respect to FIGS. 5A-B provides an alternative to using barrier objects to ensure consistency of snapshots. Under the approach of FIGS. 5A-B, unflushed records (which are acknowledged prior to the creation of a snapshot) are flushed twice—namely to their destination volume and to the snapshot of the destination volume. This approach is advantageous over the use of barrier object because it avoids the introduction of volume/snapshot data cross-dependencies, which could interfere with I/O processing.

In some implementations, when records 202 are marked as splitflush records (at step 508), only copies of the records 202 that are stored in volatile memory may be modified. In such implementations, any backup copies of the transaction log 114 that are stored in non-volatile memory would not be modified. However, the split flush markings can be easily recovered by using a recovery process, which is discussed further below with respect to FIG. 6. In some respects, the marking of records that are stored in volatile memory only may be advantageous because it may help avoid any reductions in system performance that could result from performing (slow) writes to a back-up copy of the transaction log that is stored in non-volatile memory.

In some implementations, the process 500A may be executed atomically (e.g., by using one or more locks) while any flushing of the log 114 is suspended. Executing the process 500B as an atomic operation may prevent the occurrence of race conditions. In the absence of atomic execution, such race conditions could occur when a record 250 is flushed from the log 114 after a snapshot is created, but before the record 250 is marked as a splitflush record.

Figure 6:
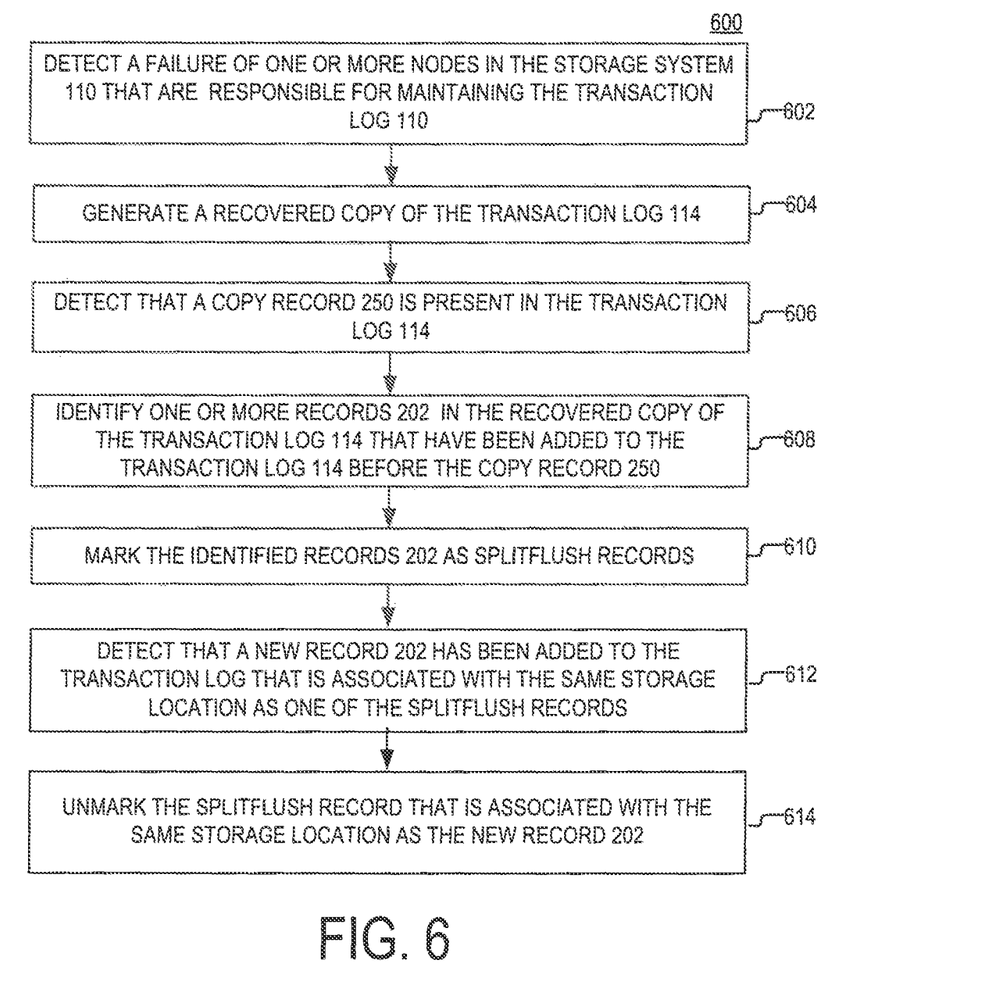
FIG. 6 is a flowchart of an example of a process, according to aspects of the disclosure.

FIG. 6 is a diagram of an example of a process 600 for recovering the transaction log 114 in the event of a failure in the storage system 110. At step 602, a failure is detected in one or more nodes of the storage system 110 that are responsible for maintaining the transaction log 114. According to the present example, the failure renders the transaction log 114 inaccessible. At step 604, a recovered copy of the transaction log 114 is loaded in volatile memory from a backup copy that is stored in non-volatile memory. At step 606, the presence of a copy record 250 is detected in the recovered copy of the transaction log 114. As noted above, the copy record 250 is associated with the snapshot of a data volume in the storage system 110. At step 608, the recovered copy of the transaction log 114 is scanned to identify one or more records 202 that have been added to the transaction log 114 before the copy record 250. In some implementations, step 608 may be performed in the same or similar manner as step 506 of the process 500. At step 610, each of the identified records 202 is marked as a splitflush record. In some implementations, step 610 may be performed in the same or similar manner as step 508 of the process 500. At step 612, a new record 202 is detected, which has been added to the transaction log 114 after the copy record 250, and which is associated with the same storage location as a respective one of the records 202 that are marked as split flush records (at step 610). In some implementations, step 612 may be performed in the same or similar manner as step 510 of the process 500. At step 614, the respective (splitfulush) record 202 is unmarked. In some implementations, step 614 may be performed in the same or similar manner as step 512 of the process 500.

Figure 7:
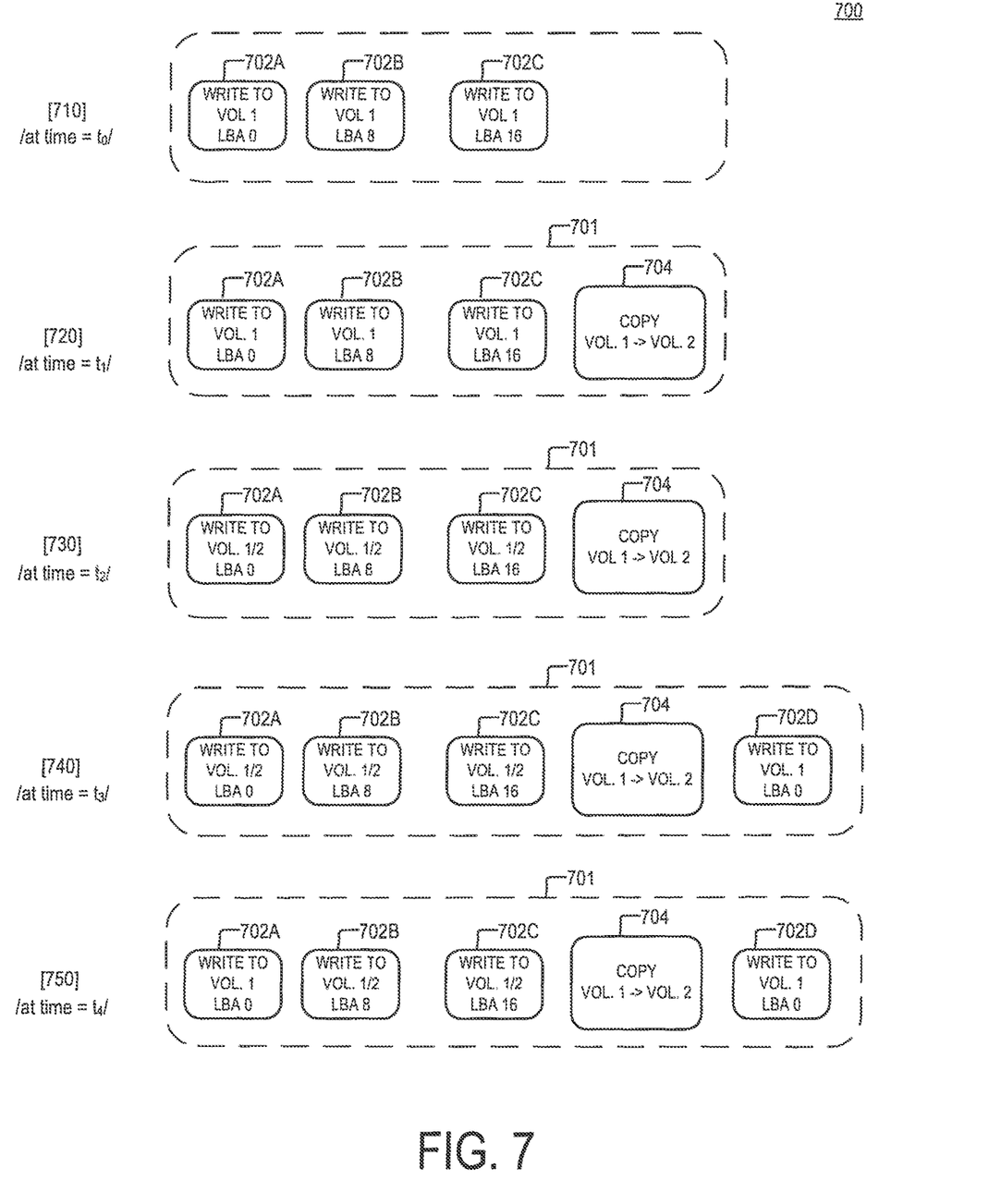
FIG. 7 is a schematic diagram of an example of a process, according to aspects of the disclosure.

FIG. 7 is a schematic diagram of a process 700 for finalizing a snapshot of a data volume, according to aspects of the disclosure.

Shown in stage 710 is the state of a transaction log 701 at a time $t_0$. As illustrated, at time $t_0$, the transaction log 701 may include a plurality of records 702. In some implementations, the transaction log 701 may be the same or similar to the transaction log 114, which is discussed above with respect to respect to FIGS. 1-6. Additionally or alternatively, in some implementations, each of the records 702 may be the same or similar to any of the records 202, which are discussed above with respect to respect to FIGS. 1-6.

Shown in stage 720 is the state of the transaction log 701 at a time $t_1$. As illustrated, at time $t_1$, a copy record 704 is added to the transaction log 701. The copy record 704 may correspond to a snapshot of a data volume (e.g., Vol. 1). In some implementations, the copy record may be the same or similar to the copy record 250, which is discussed above with respect to respect to FIGS. 1-6.

Shown in stage 730 is the state of the transaction log 701 at a time $t_2$. As illustrated, at time $t_2$, all records 702 that have been added to transaction log 701 before the copy record 704 are marked as splitflush records. In the present example, records 702A-C are marked. As noted above, marking the records 702 may include retrieving a snapshot identifier (e.g., Vo. 2) from the copy record 704, and inserting the retrieved snapshot identifier into the records 702A-C.

Shown in stage 740 is the state of the transaction log 701 at a time $t_3$. As illustrated, at time $t_3$, a new record 702 is added to the transaction log 701, which identifies the same storage location as record 702A (i.e., Vol 1, LBA 0).

Shown in stage 750 is the state of the transaction log 701 at a time $t_4$. As illustrated, at time $t_4$, the record 702A is unmarked. As illustrated, umparking the record 702 may include removing from the record 702A the snapshot identifier (i.e., Vo. 2), which was added at time $t_2$.

Figure 8:
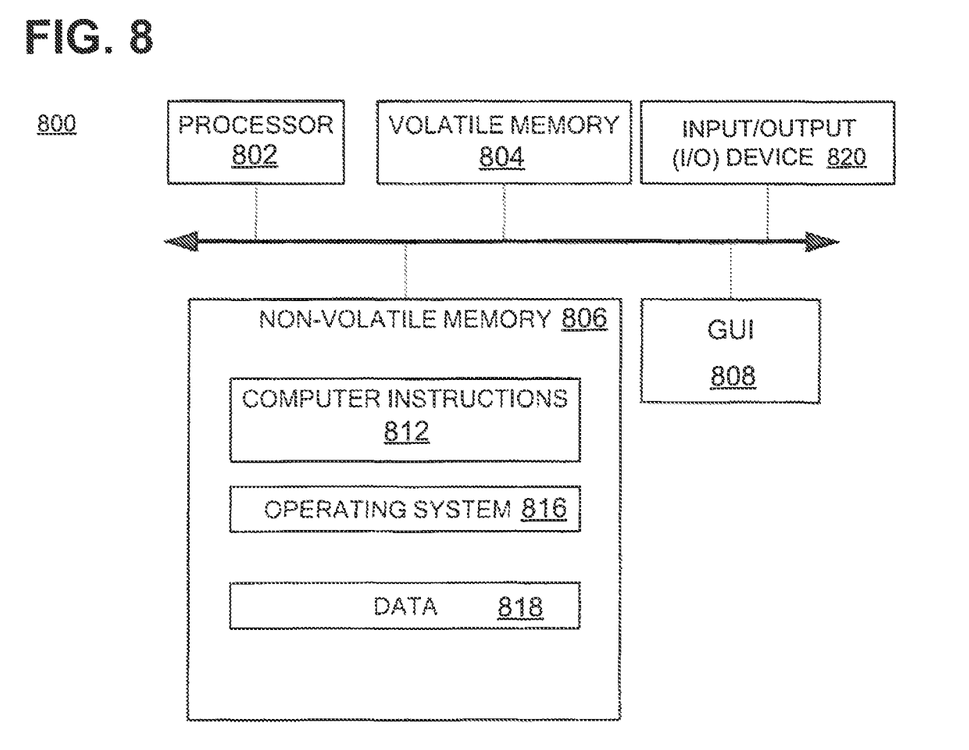
FIG. 8 is a diagram of an example of a computing device, according to aspects of the disclosure.

Referring to FIG. 8, in some implementations, any of the processes discussed with respect to FIGS. 1-7 may be executed by one or more computing devices 800. Each computing device 800 may include processor 802, volatile memory 804 (e.g., RAM), non-volatile memory 806 (e.g., a hard disk drive, a solid state drive such as a flash drive, a hybrid magnetic and solid state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of the processes discussed with respect to FIGS. 1-7.

According to the example of FIGS. 1-8, transaction log records are marked as splitflush records by inserting a second volume identifier (corresponding to a snapshot) in the transaction log records. However, it will be understood that the present disclosure is not limited thereto. For example, in some implementations, a separate data structure may be maintained and updated, which records in a transaction log are marked as splitflush records. Stated succicntly, the present disclosure is not limited to any specific method for marking transaction log records as spliflush records.

FIGS. 1-8 are provided as an example only. At least some of the steps discussed with respect to FIGS. 1-8 can be performed concurrently, performed in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply.

Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
generating a snapshot of a volume in a storage system;
generating a snapshot marker and adding the snapshot marker to a transaction log of the storage system;
scanning the transaction log to identify one or more records that have been added to the transaction log before the snapshot marker, and marking each of the identified one or more records as a splitflush record; and
flushing any record that is stored in the transaction log by: (a) detecting whether the record is marked as a splitflush record, (b) when the record is marked as a splitflush record, copying the record both to a data store and to the snapshot, and (c) when the record is not marked as a splitflush record, copying the record to the data store only.

2. The method of claim 1, wherein any record that is stored in the transaction log is assigned a logical sequence number (LSN) and the snapshot marker is also assigned an LSN, and scanning the transaction log includes identifying one or more records in the transaction log that have lower LSNs than the snapshot marker.

3. The method of claim 1, wherein at least some of the identified one or more records that are marked as splitflush records are flushed in parallel with one another.

4. The method of claim 1, further comprising:
generating a recovered copy of the transaction log in response to a failure in the storage system;
detecting that the snapshot marker is present in the recovered copy of the transaction log; and
scanning the recovered copy of the transaction log to identify one or more records that have been added to the transaction log before the snapshot marker, and marking each of the one or more records that are identified in the recovered copy of the transaction log as a splitflush record.

5. The method of claim 1, further comprising unmarking a respective one of the identified one or more records when a new record is added to the transaction log that is associated with a same logical block address as the respective record.

6. The method of claim 1, wherein the transaction log includes a ring buffer having a tail and a head, and adding the snapshot marker to the transaction log includes adding the snapshot marker at the head of the ring buffer.

7. The method of claim 1, wherein marking any of the identified records as a splitflush record includes modifying metadata corresponding to the identified record to reference both the snapshot and the volume.

8. A system comprising:
a memory; and
one or more processors operatively coupled to the memory, the one or more processors being configured to perform operations of:
generating a snapshot of a volume in a storage system;
generating a snapshot marker and adding the snapshot marker to a transaction log of the storage system;
scanning the transaction log to identify one or more records that have been added to the transaction log before the snapshot marker, and marking each of the identified records as a splitflush record; and
flushing any record that is stored in the transaction log by: (a) detecting whether the record is marked as a splitflush record, (b) when the record is marked as a splitflush record, copying the record both to a data store and to the snapshot, and (c) when the record is not marked as a splitflush record, copying the record to the data store only.

9. The system of claim 8, wherein any record that is stored in the transaction log is assigned a logical sequence number (LSN) and the snapshot marker is also assigned an LSN, and scanning the transaction log includes identifying one or more records in the transaction log that have lower LSNs than the snapshot marker.

10. The system of claim 8, wherein at least some of the identified one or more records that are marked as splitflush records are flushed in parallel with one another.

11. The system of claim 8, wherein the one or more processors are further configured to perform the operations of:
generating a recovered copy of the transaction log in response to a failure in the storage system;
detecting that the snapshot marker is present in the recovered copy of the transaction log; and
scanning the recovered copy of the transaction log to identify one or more records that have been added to the transaction log before the snapshot marker, and marking each of the one or more records that are identified in the recovered copy of the transaction log as a splitflush record.

12. The system of claim 8, wherein the one or more processors are further configured to perform the operation of unmarking a respective one of the identified one or more records when a new record is added to the transaction log that is associated with a same logical block address as the respective record.

13. The system of claim 8, wherein the transaction log includes a ring buffer having a tail and a head, and adding the snapshot marker to the transaction log includes adding the snapshot marker at the head of the ring buffer.

14. The system of claim 8, wherein marking any of the identified records as a splitflush record includes modifying metadata corresponding to the identified record to reference both the snapshot and the volume.

15. A non-transitory computer-readable medium storing processor-executable instructions, which when executed by at least one processor cause the processor to perform operations of:

generating a snapshot of a volume in a storage system;

generating a snapshot marker and adding the snapshot marker to a transaction log of the storage system;

scanning the transaction log to identify one or more records that have been added to the transaction log before the snapshot marker, and marking each of the identified one or more records as a splitflush record; and flushing any record that is stored in the transaction log by: (a) detecting whether the record is marked as a splitflush record, (b) when the record is marked as a splitflush record, copying the record both to a data store and to the snapshot, and (c) when the record is not marked as a splitflush record, copying the record to the data store only.

16. The non-transitory computer-readable medium of claim 15, wherein any record that is stored in the transaction log is assigned a logical sequence number (LSN) and the snapshot marker is also assigned an LSN, and scanning the transaction log includes identifying one or more records in the transaction log that have lower LSNs than the snapshot marker.

17. The non-transitory computer-readable medium of claim 15, wherein at least some of the identified one or more records that are marked as splitflush records are flushed in parallel with one another.

18. The non-transitory computer-readable medium of claim 15, wherein the processor-executable instructions, when executed by the at least one processor, further cause the perform the operations of:

generating a recovered copy of the transaction log in response to a failure in the storage system;

detecting that the snapshot marker is present in the recovered copy of the transaction log; and scanning the recovered copy of the transaction log to identify one or more records that have been added to the transaction log before the snapshot marker, and marking each of the one or more records that are identified in the recovered copy of the transaction log as a splitflush record.

19. The non-transitory computer-readable medium of claim 15, wherein the processor-executable instructions, when executed by the at least one processor, further cause the processor to perform the operation of unmarking a respective one of the identified one or more records when a new record is added to the transaction log that is associated with a same logical block address as the respective record.

20. The non-transitory computer-readable medium of claim 15, wherein the transaction log includes a ring buffer having a tail and a head, and adding the snapshot marker to the transaction log includes adding the snapshot marker at the head of the ring buffer.

* * * * *